United States Patent [19]

Crossland et al.

[11] 4,411,494
[45] Oct. 25, 1983

[54] ROUGHENING SURFACES FOR HOMEOTROPIC LAYERS OF SMECTIC LCD'S

[75] Inventors: William A. Crossland, Harlow; David Coates, Bishop's Stortford, both of England

[73] Assignee: International Standard Electric Corporation, New York, N.Y.

[21] Appl. No.: 209,235

[22] Filed: Nov. 21, 1980

Related U.S. Application Data

[63] Continuation of Ser. No. 965,552, Dec. 1, 1978, abandoned.

[30] Foreign Application Priority Data

Jan. 18, 1978 [GB] United Kingdom ............. 2062/78

[51] Int. Cl.³ ..................... G02F 1/137; G02F 1/133
[52] U.S. Cl. ............................. 350/339 R; 350/340; 350/350 S
[58] Field of Search .................. 350/340, 341, 350 S

[56] References Cited

U.S. PATENT DOCUMENTS 3,914,020 10/1975 Helfrich ........................... 350/340
4,038,439 7/1977 Gibson et al. ..................... 350/340
4,139,273 2/1979 Crossland et al. ................. 350/340
4,232,947 11/1980 Funada et al. .................... 350/341

OTHER PUBLICATIONS

Coates et al., "Electrically Induced Scattering Textures in Smectic A Phases and Their Electrical Reversal", *J. Phys. D: Appl. Phys.*, vol. 11, No. 14, Oct. 1, 1978.
Guyon et al., "Anchoring and Alignment Properties of Liquid Crystals", *Nonemissive Electronic Displays*, Plenum Press, New York, 1976, pp. 132–137.

*Primary Examiner*—John K. Corbin
*Assistant Examiner*—David Lewis
*Attorney, Agent, or Firm*—T. E. Kristofferson; J. M. May

[57] ABSTRACT

An internally electroded smectic liquid crystal display cell having a layer of a smectic material sandwiched between two electroded plates having electrodes that overlap at least in part wherein each said electrode is covered with an electrically insulating coherent layer whose surface has been treated to provide it with a rough texture provides a liquid crystal display cell of low voltage threshold characteristics.

2 Claims, 5 Drawing Figures

ROUGHENING SURFACES FOR HOMEOTROPIC LAYERS OF SMECTIC LCD'S

This is a continuation of application Ser. No. 965,552, filed Dec. 1, 1978, now abandoned.

BACKGROUND OF THE INVENTION

This invention relates to liquid crystal display cells in general and more particularly to smectic LCD's having a roughened electrically insulating surface layer covering the electrodes of the cell.

It has been found that the switching threshold voltage of a smectic liquid crystal dynamic scattering display cell filled with a positive dielectric anisotropy smectic material, such as for instance 4-n-octyl-4'-cyano biphenyl, is dependent upon the surface texture of the electrodes or any insulating layer covering the electrodes. In particular it has been found that when the electrodes of such a cell are covered with a chemical vapor reaction deposited insulating layer, such as a silica layer deposited by reacting silane with oxygen, the smooth surface of the deposited layer provides a particularly high threshold.

SUMMARY OF THE INVENTION

Accordingly it is an object of the present invention to provide a liquid crystal display cell having a low threshold voltage as a result, of a roughened electrically insulating surface layer covering the electrodes of the cell.

According to the present invention there is provided an internally electroded smectic liquid crystal display cell having a layer of a smectic material sandwiched between two electroded plates having electrodes that overlap at least in part wherein each said electrode is covered with an electrically insulating coherent layer whose surface has been treated to provide it with a rough texture.

BRIEF DESCRIPTION OF THE DRAWINGS

There follows a description of a smectic liquid crystal dynamic scattering display cell embodying the invention in a preferred form. This description is followed with details of a number of other cells illustrating how the threshold switching threshold is affected by surface texture. The description refers to the drawings accompanying the Specification in which.

DETAILED DESCRIPTION OF THE INVENTION

Figure 1:
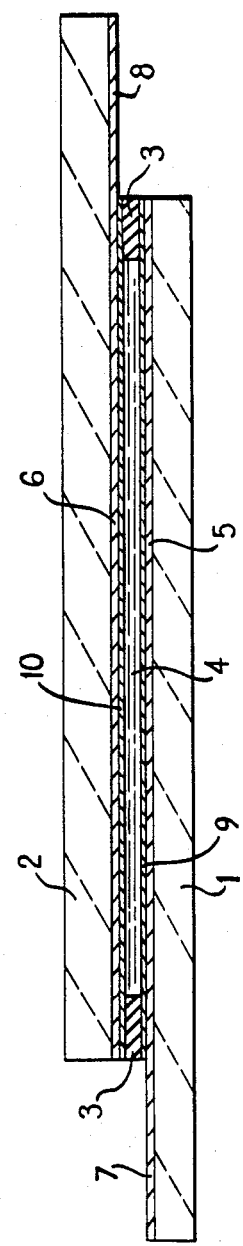
FIG. 1 depicts a schematic cross-sectional view of a display cell embodying the present invention.

Referring to FIG. 1, a display cell has two sheets of glass 1 and 2 secured together with a perimeter seal 3 to form an envelope for a layer of a positive dielectric anisotropy smectic material, such as 4-n-octyl-4'-cyanobiphenyl, to be hermetically sealed within the cell. The cell is filled via an aperture (not shown) formed by an interruption in the perimeter seal 3. After the cell has been filled this aperture is sealed off with a plug (not shown) for instance of indium. Alternatively solder is used, the aperture having been previously metallized.

Before they are secured together, the inwardly facing surfaces of the two sheets are provided with transparent electrodes 5 and 6 of appropriate layout of the required display to enable an electric field to be applied across the thickness of at least selected portions of the liquid crystal layer. For this purpose the electrodes extend beyond the perimeter seal to regions 7 and 8 respectively to permit external connection. Within the area enclosed by the perimeter seal the electrodes are covered with a transparent layer 9 and 10 of electrically insulating material designed to prevent the flow of direct current through the liquid crystal layer if ever the electrodes are subjected to a d.c. bias. A preferred material for these transparent layers is silica deposited by chemical vapor reaction of for instance silane with oxygen. Typically these transparent layers are between 6,000 and 8,000 Å thick. It is found that the surface of silica deposited in this way is relatively smooth, typically having less than 10 peaks of 20 Å or greater per mm length across the surface. This surface is then roughened, for instance by etching. An etching solution which may be used for this purpose consists of 12 parts by weight water, 15 parts ammonium bifluoride, 8 parts oxalic acid, 10 parts ammonium sulphate, 40 parts glycerol, and 15 parts barium sulphate. This solution etches the silica quite rapidly and so care must be taken to halt the etching before the solution penetrates to the underlaying electrode. Typically the layer is etched for about 3 seconds before the etching is arrested.

For operation as a display cell which can be switched on with a signal at one frequency and erased with a signal at another frequency, the cell incorporates a homeotropic alignment inducing medium for the liquid crystal layer. This may take the form of a surface treatment of the confining walls of the cell, with for instance hexadecyl trimethyl ammonium bromide, or the dispersion through the liquid crystal layer of a suitable surfactant such as the low viscosity polyamide resin sold under the designation Versmid 100. If the polamide resin is used it may be necessary to add a further additive to lower the resistivity to a value suitable for dynamic scattering, typically less than $10^9$ ohms cm.

With a 20 μm thick layer 4, the threshold of dynamic scattering was found to be in the region of 140 volts r.m.s. at 50 Hz when the silica layers are roughened by etching; whereas if the layer were left unetched the cell still had not reached threshold at 290 volts r.m.s. (290 volts r.m.s. was the maximum voltage available from the particular power supply used).

Figure 2:
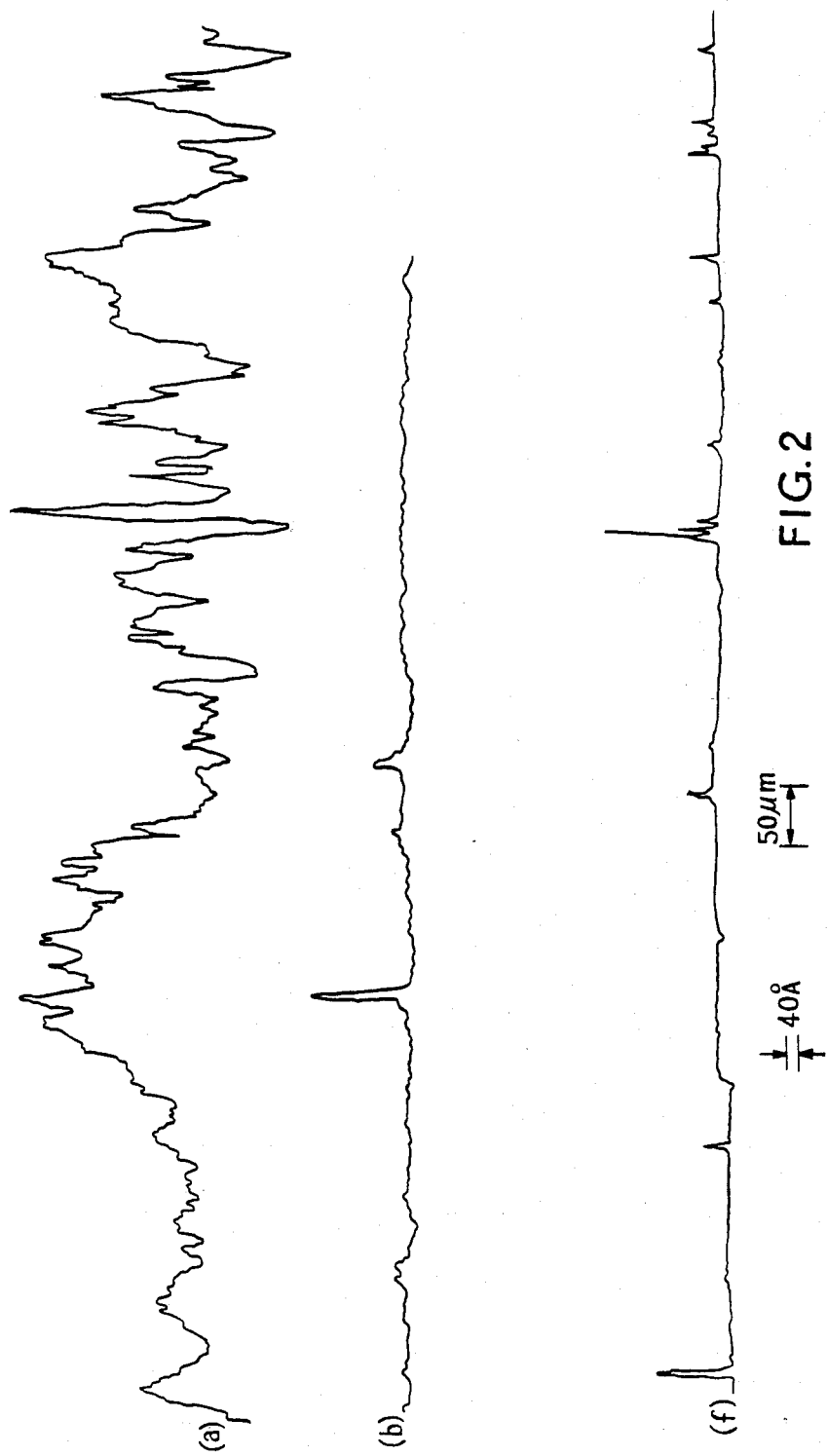
FIGS. 2 and 3 depict traces of the surface texture of a number of different samples of uncovered glassbacked transparent electrodes.
Figure 3:
Figure 3:

In order to investigate how the switching threshold is affected by the roughness of the surface texture in contact with the liquid crystal medium a number of other cells have been constructed, and their switching thresholds have been correlated with their surface roughness. One cell was constructed using electroded plates supplied by Optical Coating Laboratories Inc. (OCLI). Surface roughness was measured with a stylus tracked over the electrode surface. A reproduction of a typical trace is given at (a) in FIG. 2. The mean number of peaks of 20 Å or greater appearing in a typical trace was estimated to be approximately 140 per mm. The switching threshold was 130 volts. Similar measurements made on a cell made with electroded plates supplied by Triplex gave a switching threshold of 212 volts. A reproduction of a typical trace is given at (b) in FIG. 2. The estimated number of peaks of 20 Å or greater was 60 per mm. Traces (c), (d) and (e) in FIG. 3 are reproductions of traces obtained from three cells made with different samples of electroded plates supplied by Balzers. Estimates of their roughnesses were respectively approximately 190, 95 and 75 peaks of 20 Å or greater per mm. The corresponding switching thresholds were 110 volts, 195 volts and 202 volts respectively. A cell with a somewhat smoother surface was provided by baking a pair of electroded sheets supplied by Balzers before assembling them into a cell. For this purpose the plates were baked overnight at 450° C. A reproduction of a trace obtained from the surface of an electrode of one of these plates is given at (f) in FIG. 2. An estimate of the approximate number of peaks of 20 Å or greater was 15 per mm. The switching threshold of this cell was found to be in excess of 290 volts.

Figure 4:
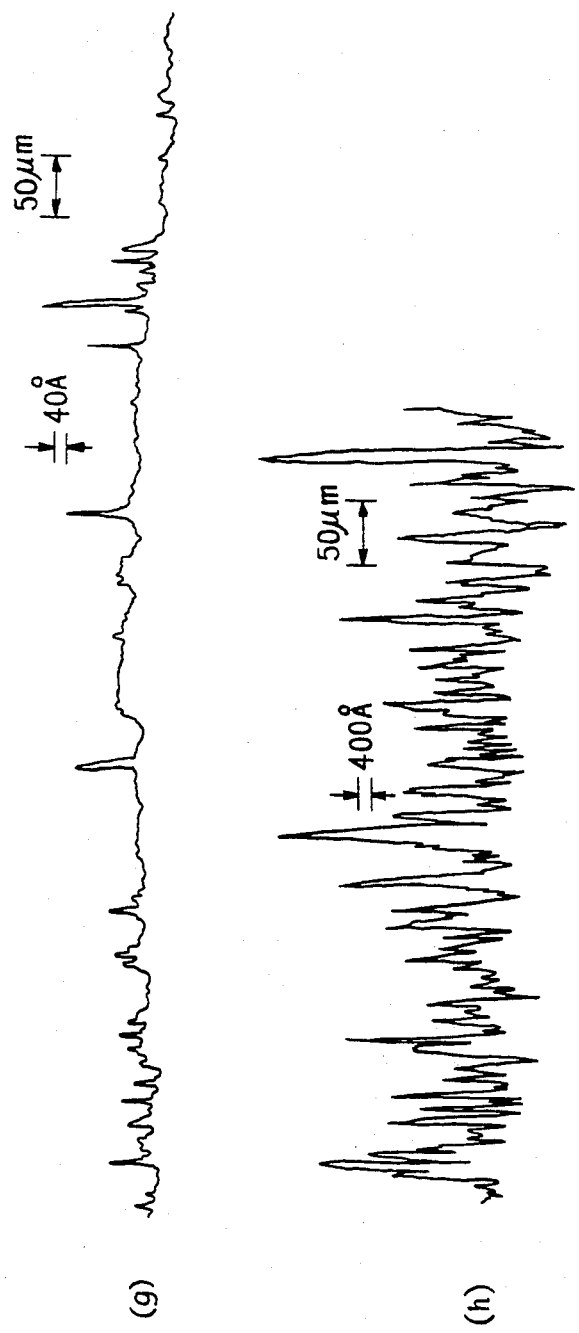
FIG. 4 depicts two traces of the surface textures of silica covered glassbacked transparent electrodes respectively before and after etching.

Referring now to FIG. 4, similar traces (g) and (h) were made of the surface roughness of two cells whose electrodes were covered with silica deposited by the chemical vapor reaction of silane with oxygen. In the case of the cell providing trace (g) the surface was not modified after the deposition process, whereas in the case of the cell providing trace (h) the surface of the silica was roughened with a 3 second etch using the etching solution previously described. Trace (g) has approximately 50 peaks (of 20 Å) per mm and trace (h) approximately 145 peaks of 200 Å or greater. The switching threshold of the unetched cell was in excess of 270 volts whereas that of the latter was 150 volts.

Figure 5:
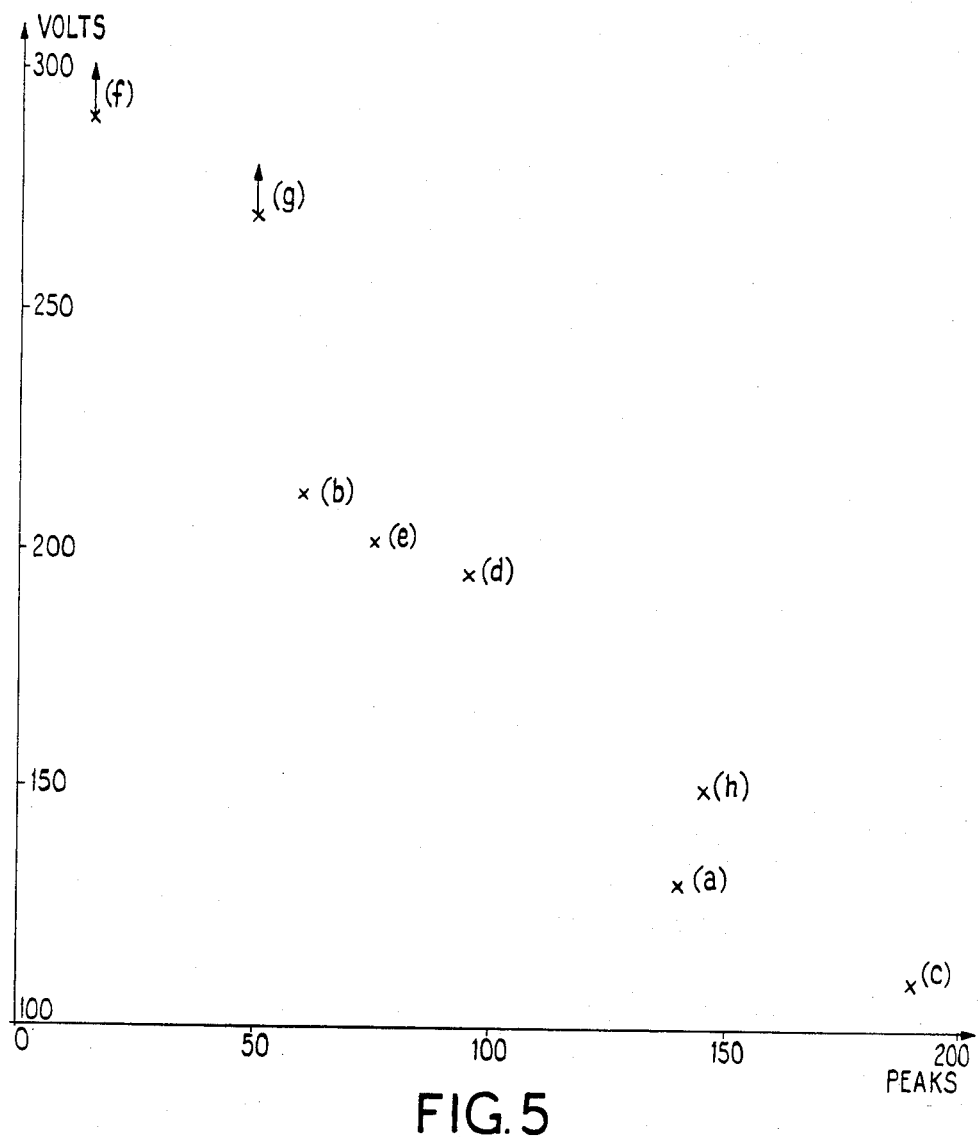
FIG. 5 is a plot depicting the relationship between switching threshold and number of surface roughness peaks per unit distance across the surface.

FIG. 5 shows a plot of switching threshold voltage against number of peaks of 20 Å or greater per mm for each of the traces (a) to (g). In this figure the letters identifying the plots correspond with those used to identify their respective surface roughness traces illustrated in FIGS. 2, 3 and 4. The plot (h) for trace (h) is also given, though in this instance it is to be noted that the number of peaks per mm represents, on account of the extra roughness of that surface, the number of peaks of 200 Å or greater, rather than of 20 Å or greater.

For the purpose of the above measurements a cell was arbitrarily deemed to be switched by the application of a given voltage if it produced a 100% scattering texture over a circular area of 10 mm diameter within one second of application. A further stipulation was that the erase voltage, used prior to switching, was the minimum voltage required to effect erasure. Some stipulation of this sort was found to be necessary in order to eliminate spurious results occasioned by the fact that erasure at a high voltage tended to increase the switching threshold the next time the cell was switched.

While we have described above the principles of our invention in connection with specific apparatus it is to be clearly understood that this description is made only by way of example and not as a limitation to the scope of our invention as set forth in the objects thereof and in the accompanying claims.

We claim:

1. A liquid crystal display comprising:
   a pair of spaced opposed glass plates each having an inward facing surface;
   a pair of opposed transparent electrodes each supported by a different one of said inward facing surfaces;
   liquid crystal material in homeotropic alignment sandwiched between said electrodes; and
   a layer of transparent electrically insulating coherent silica deposited on each of said electrodes, each of said layers having an etch roughened surface comprising a plurality of peaks in the range of about 50–190 peaks of 20 Å or greater per mm length across an associated one of said electrodes to provide a rough surface for said associated one of said electrodes adjacent said material so that said display has a low switching voltage threshold.

2. A method of forming a smectic cell having a low switching voltage threshold comprising the steps of:
   providing two spaced, parallel glass plates each having an inwardly facing surface;
   disposing a transparent electrode on each of said inwardly facing surfaces;
   depositing by a chemical vapor reaction a transparent layer of silica on each of said electrodes;
   etching each of said layers for a predetermined period of time to provide a roughened inwardly facing surface of a predetermined roughness for each of said electrodes so that said display has said low switching voltage threshold;
   assembling said plates to define a cell; filling said cell with a smectic material; and
   sealing said cell.

* * * * *